Patented Feb. 27, 1951

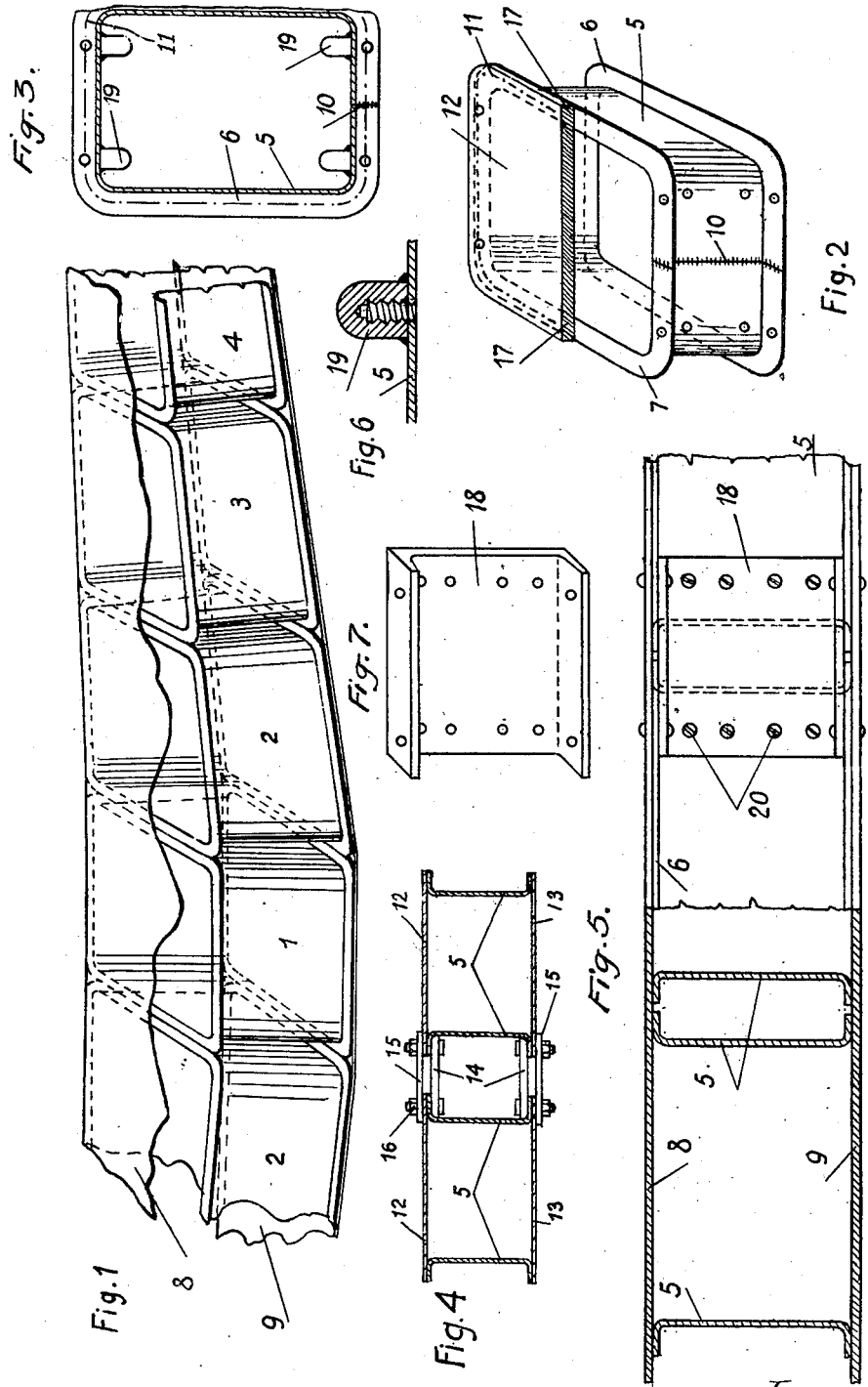

2,543,709

UNITED STATES PATENT OFFICE 2,543,709

STRUCTURE MADE OF HOLLOW SHAPED COMPONENTS AND ESPECIALLY TO AIRCRAFT WINGS

Raymond Saulnier, Paris, France

Application June 29, 1946, Serial No. 680,398
In France March 7, 1946

5 Claims. (Cl. 244—124)

In the French Patent No. 863,104 to the Morane Saulnier Company of January 27th, 1940 for "Improvements to Aircraft" has been featured an aircraft wing composed of a grouping of tanks associated together and forming the main framework of the wing planned to absorb all the stresses including the bending strains.

The bending strain is formed by a torque produced by a force which is the resultant of the lifting stresses on the wing with a lever arm equal to the part of the wing located between this resultant and the longitudinal axis of the aircraft. The parts of the wing that convey the stress to the longitudinal axis are composed, in this case, by the upper and lower planes of the framework, one taking the tensile strains and the other the compressional strains. It follows from this that the planes must be built so as to be capable of withstanding these stresses in the best possible way.

Moreover, the actual building of the components of the framework, that is to say the tanks, is extremely ticklish since it is necessary to proceed carefully to avoid leakages of the inflammable fuel that ordinarily fills these receptacles.

With the customary building of these tanks, trouble is met in welding the corners, as the wheel may not be able to reach these corners, and there is a necessity to provide special arrangements, such as for instance those disclosed in applicant's U. S. Patent No. 2,335,451, issued November 30, 1943.

My invention removes these drawbacks by eliminating on the one hand all hazard of leakage, and this through extremely simple welding processes, and on the other hand by ensuring the transmission of the strains and stresses all along the upper and lower planes of the wing.

In accordance with the invention, each tank is composed of a metal sheet folded so as to form a cylinder, with the adjacent edges welded together by a welding line, for instance by arc-welding, while the upper and lower edges of the sheet are folded at right angles, so as to form two flat surfaces or flanges on which the cylinder heads are subsequently placed. The welding between the heads and the flanges may be carried out in any suitable way, for instance electrically by lap-welding or spot-welding at close intervals.

Thus it may be seen that the requisite weldings to secure a leak-proof tank are extremely easy to execute, since they are made along an uninterrupted line without any laps and since there is no ticklish or interrupted welding liable to give rise to leakages. What is more, for instance in the case of an aircraft wing, where the bending stresses are transmitted by the upper and lower planes, the upper and lower cover-plates of the tanks, instead of being made individually for each of the tanks, may be formed by uninterrupted plates covering the grouping of the tanks and welded to each of them along the periphery of each tank. In this way, these plates do not present any lack of continuity all along the part of the wing under consideration and they play to perfection their mechanical part in standing up to compression and tensile stresses.

In accordance with a method of execution, the assembly may be perfected by inset plates intended to stand the shearing stresses.

The invention will be understood better with the help of the accompanying drawings on which have been illustrated by way of examples several forms of execution of the invention. In these drawings:

Fig. 1 is a perspective view showing part of an aircraft wing formed by a grouping side by side of tanks and executed in accordance with the invention, the covers of the separate tanks being formed by two cover-plates stretching over the length of the tank assembly.

Fig. 2 is a perspective view showing the way of forming a tank in accordance with the invention, said tank carrying its own cover.

Fig. 3 is a horizontal cross-section of the tank shown in Fig. 2.

Fig. 4 is a vertical section showing two interconnected tanks with individual covers.

Fig. 5 is a similar view showing two tanks the coverplates of which are formed by uninterrupted plates.

Figs. 6 and 7 illustrate details.

Referring to the drawings, it may be seen in Fig. 1 that 1 denotes the central tank and 2, 3, 4 the tanks that are positioned on either side of the first tank. In this example, the plates 8 and 9 form the uper and lower cover plates of the tanks and are each in one piece so as to convey the compression and tensile stresses to which they are subjected, and these plates 8 and 9 are welded to the flat edges of the separate tanks along welding lines extending throughout the whole length of the periphery of each of the tanks.

Obviously, although in the example given in Fig. 1, the wing has been pictured as being formed by a large number of tanks, in practice the more favorable way is to form the wing of three tanks: a central one and a tank placed on each side thereof.

In Fig. 2 may be seen the way of forming a tank in accordance with the invention. With this object in view, a flat metal sheet is taken, it is bent four times so as to form a closed substantially cylindrical member and the adjacent edges of the folded metal sheet are welded along the line 10, preferably by arc-welding or torch-welding. Then the two edges 6 and 7 of the cylinder are turned down so as to form two flat surfaces. Evidently it is possible just as well to turn back first the two edges of the sheet 5, then bend it and subsequently weld it.

The two flat cover-plates are laid then on the two level surfaces formed by the flanges. In Fig. 2 the lower cover-plate has not been shown and only half the upper plate 12. This is electrically lap-welded along the line 11. Part of the metal of the two pieces melted by the welding operation is shown sectionally at 17. In Fig. 7 is shown at 18 a plate designed as an insert for connecting together two adjacent tanks, so that shearing stresses may be communicated through it. In Figs. 3 and 6 are shown at 19 blind nuts rigid with the sides of the tank, fitted in a leak-tight way and intended for the fastening of the plates 18.

In the example of Fig. 4, there is illustrated the assembly of two tanks carrying separate cover-plates. In this example, the connection is formed by plates 14 and 15 fitted respectively on the inside and on the outside of the flanges of the tanks, the whole assembly being joined together by bolts and nuts 16. In this figure are shown again at 12 the upper cover-plates of the tanks and at 13 their lower cover-plates. The upper and lower plates 14 at each joint may be linked together by cross-bars or web members in such a way as to absorb the shearing stresses, which allows the elimination of the plates 18.

In Fig. 5 has been illutrated the assembly of the tanks in the case where the cover-plates, instead of being formed by separate plates, consist of uninterrupted plates 8 and 9 that cover the assembly of the tanks.

It should be understood that the invention is by no means tied to the examples featured above and that the exact shape of the cylinders, the width of the flanges, the way of bending these flanges, the kind of welding, etc. may be modified within a large range without unduly widening the scope of the invention.

What I claim is:

1. A container applicable to the constitution of aircraft wings and the like constituted by three elements, namely, a sheet metal blank bent into the form of a cylinder of substantially rectangular base, said cylinder having its meeting edges welded to each other and its upper and lower edges bent over to form a flange, and two flat covers fastened respectively to said upper and lower flanges by a continuous welded seam, the angles between said flanges and said cylinder being such that the said flat covers determine by their external faces the outline to be given to the surface of the wing.

2. An aircraft wing comprising a series of laterally connected containers, each said container being constituted by three elements, namely, a sheet metal blank bent into the form of a cylinder of substantially rectangular base, said cylinder having its meeting edges welded to each other and its upper and lower edges bent over to form a flange, and two flat covers fastened respectively to said upper and lower flanges by a continuous welded seam, the angles between said flanges and said cylinder being such that the said flat covers determine by their external faces the outline to be given to the surface of the wing.

3. An aircraft wing comprising a series of laterally connected containers, each said container being constituted by three elements, namely, a sheet metal blank bent into the form of a cylinder of substantially rectangular base, said cylinder having its meeting edges welded to each other and its upper and lower edges bent over to form a flange, two flat covers fastened respectively to said upper and lower flanges by a continuous welded seam, and vertical staying members inserted between adjacent containers for absorbing the shearing stresses, the angles between said flanges and said cylinder being such that the said flat covers determine by their external faces the outline to be given to the surface of the wing.

4. An aircraft wing comprising a series of laterally connected containers, each said container being constituted by three elements, namely, a sheet metal blank bent into the form of a cylinder of substantially rectangular base, said cylinder having its meeting edges welded to each other and its upper and lower edges bent over to form a flange, two flat covers fastened respectively to said upper and lower flanges by a continuous welded seam, and vertical members located along the outer vertical edges of the containers for absorbing the shearing stresses, the angles between said flanges and said cylinder being such that the said flat covers determine by their external faces the outline to be given to the surface of the wing.

5. An aircraft wing according to claim 2 in which the cover elements of at least two adjacent containers consist of single plates welded to at least said two containers by lines of weld along the peripheries thereof.

RAYMOND SAULNIER.

REFERENCES CITED

The following references are of record in the file of this patent:

UNITED STATES PATENTS

| Number | Name | Date |
|---|---|---|
| 911,085 | Stallberg | Feb. 2, 1909 |
| 1,316,237 | Hodgson | Sept. 16, 1919 |
| 1,565,153 | Hubert | Dec. 8, 1925 |
| 1,785,318 | Lambert | Dec. 16, 1930 |
| 1,958,124 | Bemis | May 8, 1934 |
| 1,958,142 | Halthe | May 8, 1934 |

FOREIGN PATENTS

| Number | Country | Date |
|---|---|---|
| 387,719 | Great Britain | Feb. 13, 1937 |
| 402,124 | Great Britain | Nov. 27, 1933 |
| 263,546 | Germany | Feb. 3, 1912 |